May 26, 1970     TETSUO SHIMOSAKI     3,513,727
TRANSMISSION CONTROLS
Filed Sept. 18, 1967     4 Sheets-Sheet 1
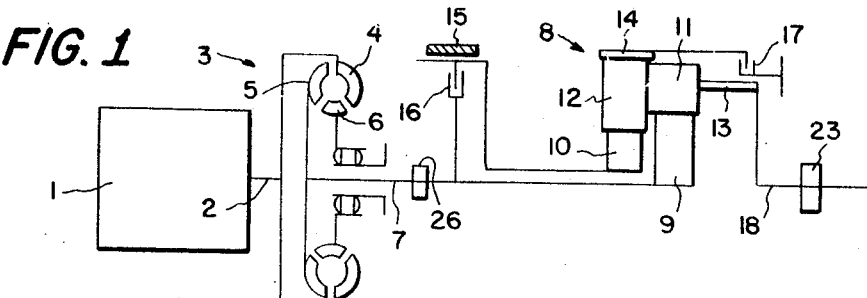
FIG. 1
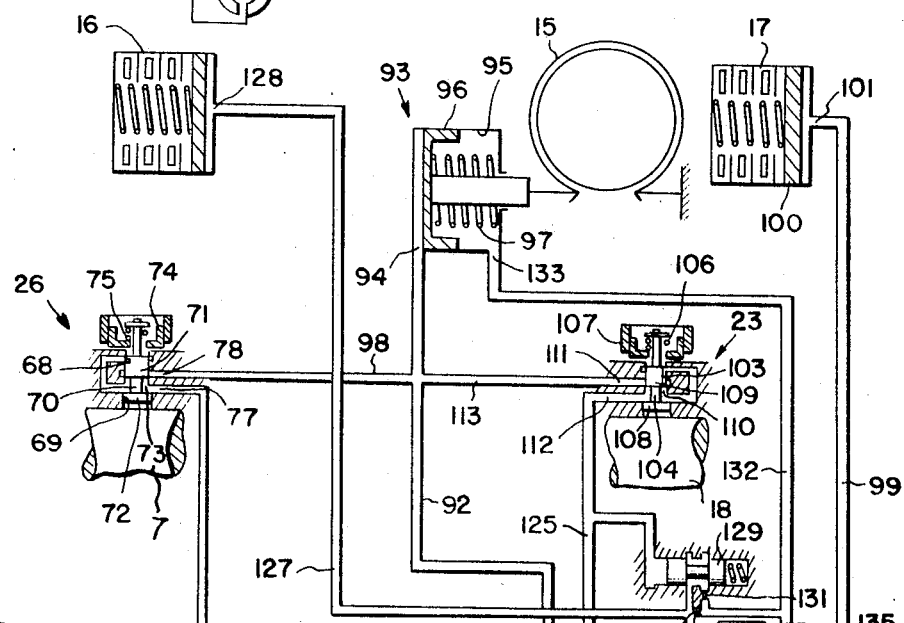
FIG. 2
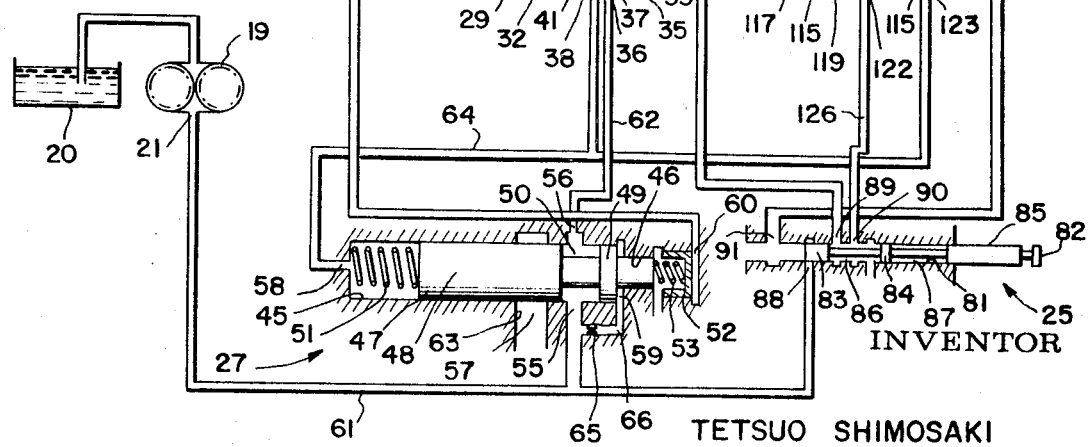
INVENTOR
TETSUO SHIMOSAKI
BY
*Wenderoth, Lind & Ponack*
ATTORNEYS

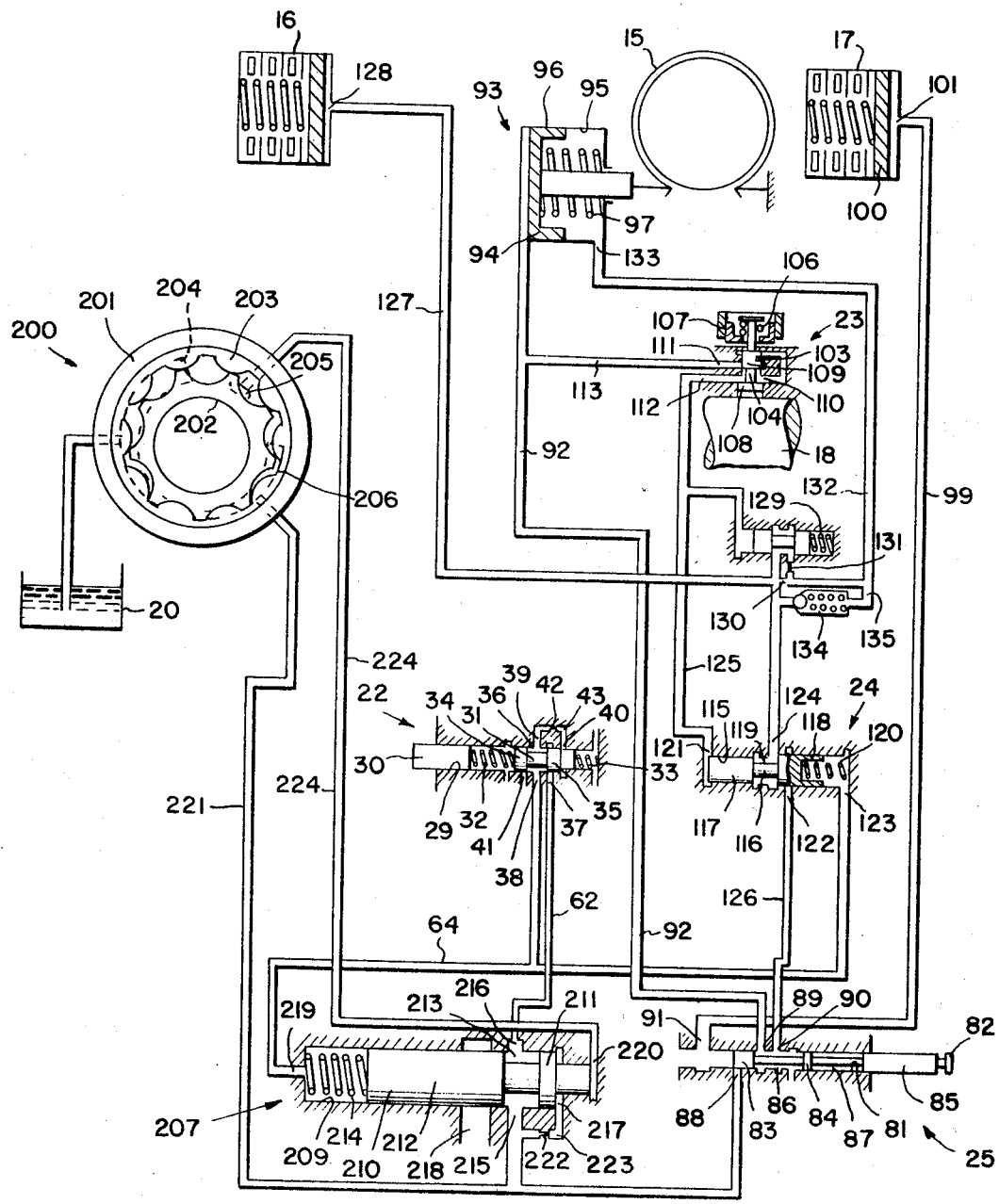

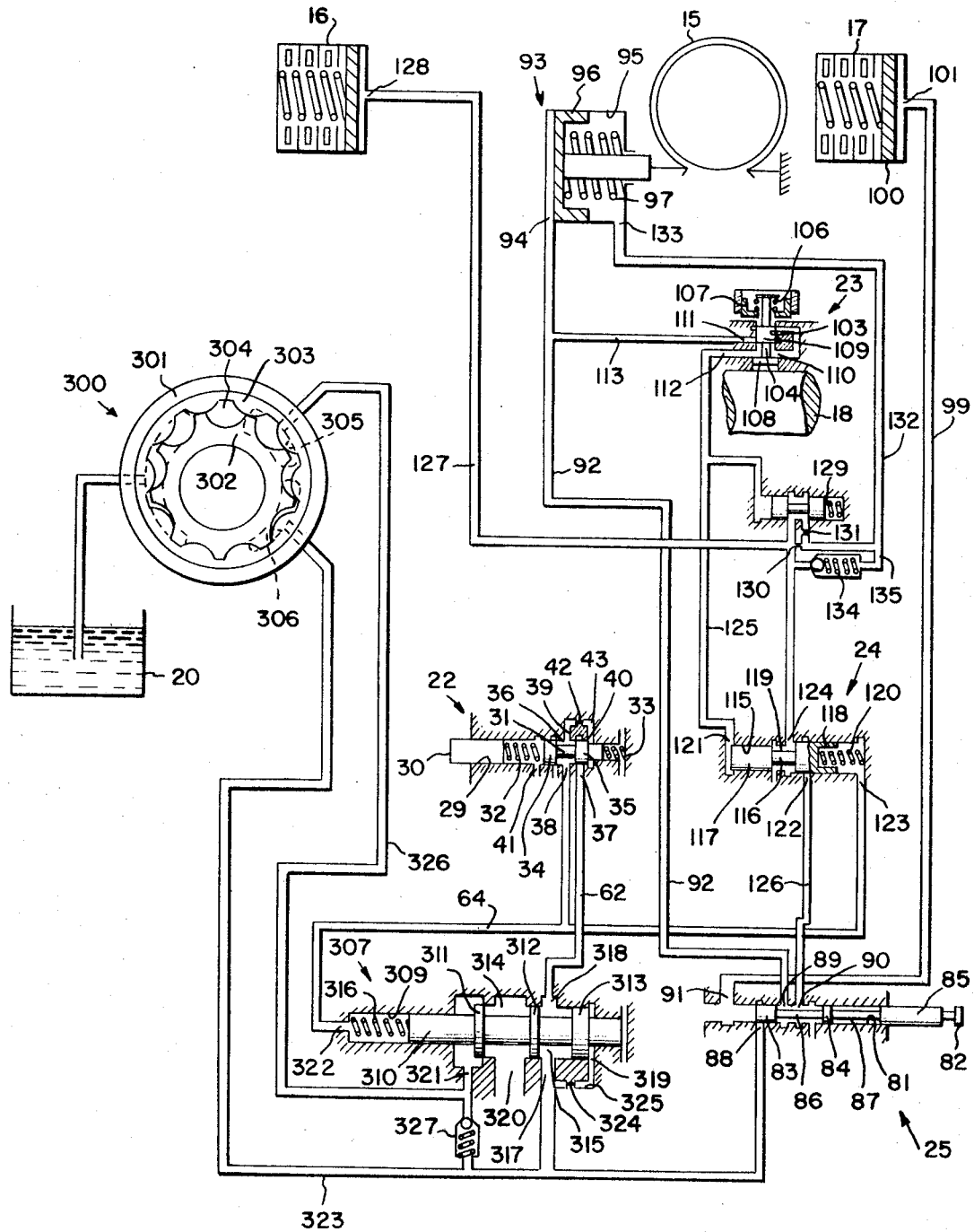

United States Patent Office 3,513,727
Patented May 26, 1970

3,513,727
TRANSMISSION CONTROLS
Tetsuo Shimosaki, Asa-gun, Hiroshima-ken, Japan, assignor to Toyo Kogyo Company Limited, Hiroshima-ken, Japan
Filed Sept. 18, 1967, Ser. No. 688,382
Claims priority, application Japan, Sept. 19, 1966, 41/62,140
Int. Cl. B60k 21/00
U.S. Cl. 74—868                                      5 Claims

ABSTRACT OF THE DISCLOSURE

An automatic transmission control for modulating the hydraulic input pressure for the clutch and/or the brake action of the automobile vehicles in conjunction with the hydraulic pressure for the automatic transmission so as to maintain the hydraulic pressure for the brake and/or clutch actions at the substantial irreducible minimum pressure and which pressure declines with increment of the engine and/or driving shaft rotation speed.

---

Figure 3:
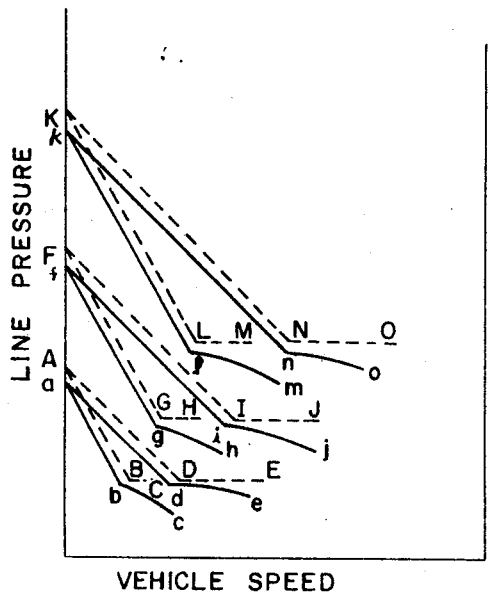

The present invention relates to an automobile vehicle having an automatic transmission and more particularly to a control for hydraulically actuated clutch and brake action for the vehicle of the type described above.

In the automatic transmissions of the automobile vehicles having fluid couplings or hydraulic torque converters and change gear means, the engine out-put is transmitted from the driving shaft with an appropriate gear-ratio well accommodated to the vehicle speed and the out-put torque, to the driven shaft, and the fluid pressure urged by the pumps driven by the driving or driven shafts is supplied through various valves and conduit lines for the actions of the clutch and/or brake. In the system above described, if the line pressure for the input for the actions of the clutch and/or the brake is less than that required for the effective braking and/or clutch-engagement, slipping at such clutch-engagement and/or the braking is unavoidable. Otherwise, if the line pressure for the input for the above said actions is excessive over the appropriate pressure well suited for the proper actions for the clutch-engagement and/or braking, undesirable shock due to such the excessive line pressure, which causes the immoderate braking and/or clutch-engagement, is unavoidable, and such excessive line pressure condition increases the consumption of the engine-power in vain.

From this view point, the required input power of said line pressure is the irreducible minimum of the demand for the braking and/or clutch-engagement or, at maximum, slightly in excess thereof therefrom. Hitherto-known average automatic controls for the solution of the problem described above having the governor valve operating responsive to the rotation condition of the driven shaft and the throttle valve operated responsive to the degree of carbureting valve opening whereby the line pressure is coordinated to the degree of carbureting valve opening and to the vehicle speed, namely, the driven shaft revolution speed. The line pressure in these known average controls is adjusted during the starting and the lower-speed and/or heavier loaded drives at a considerable higher degree and, during the higher-speed and/or lower-loaded drive the said line pressure is controlled at a relatively lower range, and with various drive conditions the said line pressure is changed accordingly.

Assuming that the average known controls provide, for instance, two forwards and one reverse change speed gears between the driving shaft and the driven shaft, it is necessary to adjust the line pressure so that the pressure changing characteristics due to the vehicle speed is capable of being well modulated to the highest drive speed condition wherein the said line pressure for the braking and/or the clutch engagement action changes or declines very gradually. This means that the control having above described line pressure changing characteristic unavoidably causes the meaningless excessive line pressure to take place for the braking and/or the clutch engagement during the low-speed gear drive whereas very rapid line pressure change is required. Otherwise, when the line pressure changing characteristic due to the vehicle speed is provided as to be well modulated to the low-speed change gear drive condition with the line pressure change due to the vehicle speed being gentle or gradual, whereas the line pressure due to the vehicle speed should be rapidly increased, the deficiency of the line pressure for the braking and/or the clutch engagement at the high-speed gear drive is unavoidable.

OBJECTS

An object of the present invention is to provide an automatic hydraulic control for clutch and brake in which the hydraulic line pressure for the brake and/or clutch actions is at the substantial irreducible minimum and declines with increment of the engine and/or driving shaft rotation speed.

Another object of the present invention is to provide the said control in which the control means is operated in response to the engine operation or the driving shaft revolution so that the line pressure for the clutch and/or the brake action is reduced with increment of the engine and/or the driving shaft rotation.

A further object of the invention is to provide such a control including a trochoid-type pump means being provided with circumferentially spaced exhaust ports through which the line pressure is controlled by operation of the engine.

Figure 5:
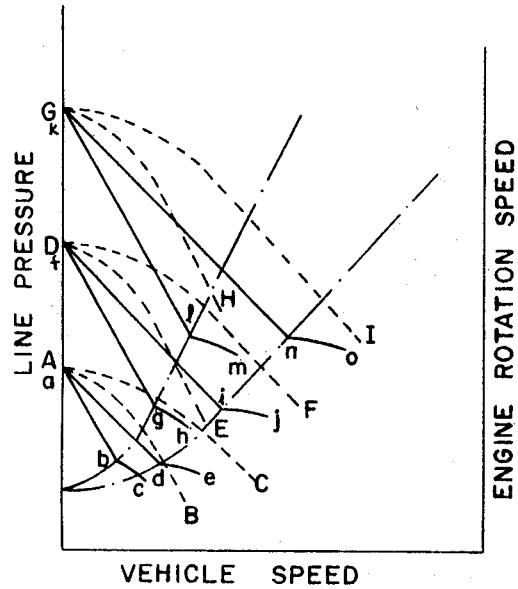
Figure 7:
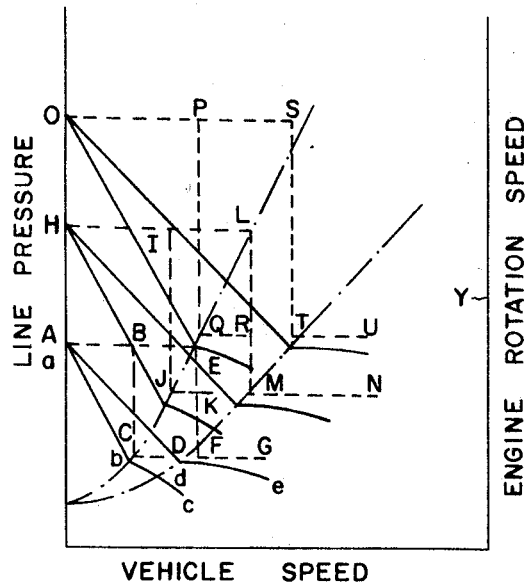

Other and further objects will become apparent from the following description taken in conjunction with the accompanying drawings, in which:

FIG. 1 is a schematic view of the apparatus according to the present invention;

FIGS. 2, 4 and 6 each diagrammatically shows a sectional view of the respective elements relative to the fluid conduit lines; and FIGS. 3, 5 and 7 are graphs showing the line pressure characteristic resulting from the embodiments shown in FIGS. 2, 4 and 6.

Referring to FIG. 1 primarily, a main driving shaft 2 is drivably connected to an engine 1 and is driven by an operation of the engine 1. Numeral 3 and its arrow generally designate a fluid torque converter which is composed of a pump 4 operatively connected to the main driving shaft 2, a turbine 5 to which the driving force from the engine is transmitted by operation of the pump 4, and a stator 6. Provided and operatively connected to the turbine 5 is a second driving shaft 7 to which the driving force from the engine 1 is transmitted through the main driving shaft 2, the pump 4 and the turbine 5. Numeral 8 and its arrow indicate generally a speed change gear means which comprises sun gears 9 and 10, a long pinion gear 11, a short pinion gear 12, a cage 13 for retaining the said pinion gears 11 and 12, and a ring gear 14 thereby constituting a two forwards and one reverse change speed gear means. The change gear means 8 is operatively connected with the fluid torque converter 3 through the second driving shaft 7 and is provided with a low band 15, a direct or forward clutch 16 and a reverse clutch 17. Said band and clutches are adapted for controlling the transmission of the driving force through the change gear means 8 by engagement or disengagement thereof and perform necessary speed changes. Connected with the cage 13 is a driven shaft 18 which is driven in accordance with the driving force transmission through the gear means 8. An oil pump 19 (see FIG. 2) is operatively connected by conventional means to the engine 1 and operated thereby, and by operation of the pump 19 the oil is pumped from an oil tank 20 through a pipe connected therebetween and supplied, under appropriate pressure, to a passage 61 shown in FIG. 2. Numeral 22 with an arrow in FIG. 2 generally indicates a throttle valve means adapted for adjustment of the throttle pressure with variation of the tilting angle of the throttle valve in the carbureter in accordance with the degree of the foot pedalling of the vehicle acceleration. Designated generally by numeral 23 and its arrow in FIG. 2 is a speed governor valve means provided on the driven shaft 18 (see also in FIG. 1), which is operative responsive to the r.p.m.'s of the said driven shaft 18, and thereby the governor speed pressure in the conduit lines connected thereto, as hereinafter described, is accordingly controlled. A shifting or slidable valve means generally designated by numeral 24 and its arrow in FIG. 2 is provided and connected by conduit lines as hereinafter described so that it operates when actuated by pressure controlled by the said governor speed valve means 23. Numeral 25 and arrow thereof in FIG. 2 generally indicate a manual valve means adapted for converting the mechanical motions initiated by means of the control levers in the driver's compartment to the fluid pressure control action, whereby selection of various gear positions such as N (neutral), D (drive range), L (low range) and R (reverse range) is performed. Indicated generally by numeral 26 and its arrow in FIG. 2 is a governor pressure valve means provided on the second driving shaft 7 (as shown also in FIG. 1), which is operative responsive to the revolution speed of the said second driving shaft 7 and is adapted for controlling the fluid pressure supplied to the conduit lines connected thereto as hereinbelow described. Numeral 27 and its arrow generally designate a main control valve means operatively connected to the oil pump 19 and is adapted for controlling the fluid pressure from the oil pump 19 to the various conduit lines, as described hereinafter, at appropriate ranges. The throttle valve means 22 comprises a cylinder 29 in which an applying piston 30 and an output piston 31 are slidably inserted. Disposed within the cylinder 29 and between the pistons 30 and 31 is a spring means 32 which is adapted for providing an appropriate distance between the pistons 30 and 31. At the other end of the piston 31 a spring means 33 is also provided which retains the piston 31 at the predetermined position but permits the piston 31 to move by compression of the spring 33 upon receipt of the fluid pressure effect as hereinafter described. The output piston 31 has axially spaced larger diameter lands 34 and 35 and forms an annular passage 36 therebetween. The applying piston 30 moves into the cylinder 29 in response to the action of the pedalling for the vehicle acceleration, and compresses the spring 32, and the compressed spring 32 urges the out-put piston 31 to move in the right-hand direction in FIG. 2, wherein the spring means 33 is also compressed.

Opening to the cylinder 29 of the throttle valve means 22 are oil ports 37, 38, 39, 40 and 41. The ports 39 and 40 are connected by passage 43 having a throat 42, and other oil ports are respectively connected or opened for each purpose as hereinafter described. The main control valve means 27 has a cylinder 45 which is provided with a smaller diameter portion 46 at the right-hand end thereof. Slidably disposed in the cylinder 45 is a main piston 47 which is being urged in the right-hand direction by spring 51 and has axially spaced larger diameter lands 48 and 49 and forming an annular passage 50 therebetween. A right-hand end of the piston 47 corresponds in diameter to that of the cylinder portion 46 and is slidably inserted in the said smaller diameter portion 46. Adjacent the smaller diameter portion 46 is a right-hand cylinder which is being larger in diameter than that of the portion 46, and axially slidably disposed in said right-hand cylinder is a plunger piston 52 which is also larger in diameter than that of the portion 46. The piston 52 is normally urged in the right-hand direction by a spring 53 disposed therein. Provided and opening and/or connected to the main control valve means 27 are oil ports 55, 56, 57, 58, 59, and 60, and the port 55 is connected through a conduit 61 to the port 21 of the oil pump 19. The oil port 56 is connected through a conduit 62 to the oil port 37 of the throttle valve means 22 and, the oil port 57 is connected through a conduit 63 to the oil tank 20. The oil port 58 is connected through a conduit 64 to the oil port 38 of the throttle valve means 22 and, the oil port 59 is connected through a conduit 66 which has a throat 65, to the conduit 61. The connection of the remaining ports of the valve means 27 will be described later.

The governor valve means 26 comprises a cylinder 68 which is provided with a larger diameter portion 69 at an end thereof, and slidably inserted within the said cylinder 68 is a piston 70 which has axially spaced larger diameter lands 71 and 72 and formed therebetween is an annular passage 73. The diameters of the lands 71 and 72 are not the same and in the embodiment shown in FIG. 2 the diameter of the land 72 is larger than that of the land 71. On the external end of the piston 70 a weight means 74 is mounted and a spring means 75 inserted for retaining the weight means 74 on the piston 70, permits the weight means 74 to resiliently move in respect or along the axis of the piston 70 responsive to the revolution of the valve means 26. Opening to the cylinder 68 of the governor valve means 26 are oil ports 77 and 78, and the oil port 77 is connected through a conduit 79 to the oil port 60 of the main control valve means 27. The connection of the port 78 will be explained hereinlater.

The manual valve means 25 comprises a cylinder 81 and within the cylinder 81 a manual piston 82 having axially spaced larger diameter lands 83, 84 and 85 and annular passages 86 and 87 between each pair of the said lands 83, 84 and 85, is axially slidably inserted. Provided and opening to the cylinder 81 of the manual valve means 25 are oil ports 88, 89, 90 and 91, and the port 88 is connected to the conduit 61 and, the port 89 is connected through a conduit 92 to a port 94 of the low servo valve means 93. The low servo valve means 93 is composed of a cylinder 95 and a piston 96 which is resiliently disposed by means of a spring 97 in the cylinder 95 and connected for operation of a low band 15. The conduit 92 is also connected through a conduit 98 to the oil port 78 of the pressure governor valve means 26. The port 91 is connected, through a conduit 99, to an oil port 101 which is by directed behind a piston 100 of a reverse clutch 17. Provided in the speed governor valve means 23 is a cylinder 103 in which a piston 104 having axially spaced larger diameter lands 108 and 109 and an annular passage 110 between the said lands is axially slidably disposed. The diameter of the lands 108 and 109 are not equal and in the embodiment shown in FIG. 2, the diameter of the land 108 is larger than that of the land 109. On an external end of the said piston 104 a weight means 107 is resiliently and axially movably disposed by means of a spring 106 disposed therebetween. Provided and opening to the cylinder 103 of the speed governor valve means 23 are oil ports 111 and 112 and the port 111 is connected through a conduit 113 to the conduit 92. The connection of the port 112 will become apparent later. Provided in the shift valve means 24 is a cylinder 115 in which a piston 116 having axially spaced larger diameter lands 117 and 118 and an annular passage 119 between the lands 117 and 118, is axially slidably disposed, but the said piston 116 is normally urged by means of a spring 120 in the left-hand direction as seen in FIG. 2. Provided and opening to the cylinder 115 of the shift valve means 24 are oil ports 121, 122, 123 and 124, and the port 121 is connected through the conduit 125 to the port 112 of the speed governor valve means 23, and the port 122 is connected to the port 90 of the manual valve means 25 through the conduit 126. The port 123 connects with the conduit 64 and the port 124 is connected through a conduit 127 to an oil port 128 of a direct clutch means 16. The oil port 124 is also connected through a conduit 132, which has an orifice control valve means 129 and throat portions 130 and 131, to an oil port 133 of the low servo valve means 93. The conduits 127 and 132 are connected by a conduit 135 having an one-way check valve 134. FIG. 2 shows the throttle valve means 22 is closed, wherein the vehicle will be stationary. Assume now that the engine is started and continues to idle with this valve in said position, the oil-pump 19 is urged to operate and thereby the oil in the oil tank 20 is urged to flow with the pressure past the port 21 and the conduit 61 to the port 55 of the main control valve means 27, and at the same time, the oil is also supplied to the port 59 through the conduit 66 and further flow to the port 88 of the manual valve means 25. However, since the manual valve means 25 is in the N (neutral) position and the port 88 is, in this stage, closed by the land 83 of the manual piston 82, the oil under pressure is not permitted to flow into the conduit 92, and the direct clutch 16, low band 15 and the reverse clutch 17 are each in a neutral position, and the driving force from the engine 1 is not transmitted to the driven shaft 18 and the vehicle thereby remains stationary. Assume now that the manual valve means 25 is shifted to D (drive) range which permits the oil port 88 to connect with the annular passage 86, the oil under pressure in the conduit 61 is permitted to flow into the conduit 92 and the oil port 94 of the low servo valve means 93, and thereby urges the piston 96 in the right-hand direction as seen in FIG. 2 against the resilient force of the spring 97, and engages the low band 15 for "ON" action. The oil under pressure in conduit 92 is also supplied through the conduits 98 and 113 to the oil ports 78 and 111 of the pressure governor valve means 26 and the speed governor valve means 23. During the above described stage, since the engine 1 is in the idling condition, the driving force from the engine 1 is not transmitted to the second driving shaft 7 nor to the driven shaft 18 due to the slipping of the fluid torque converter 3. The oil ports 78 and 111 of the governor valve means 26 and 23 in this state are accordingly in the closed position by the larger diameter lands 71 and 109 and the conduits 79 and 125 are not supplied with the oil under pressure.

Now proceeding to the next stage in which the operation of the engine 1 is further accelerated by pedalling, the driving force from the engine 1 is transmitted, through the main driving shaft 2, the fluid torque converter 3 and the second driving shaft 7, to the change speed gear means 8, thereby the driving force from the engine 1 is converted for the low speed drive and transmitted to the driven shaft 18 wherein the vehicle is in the low speed drive range (low range). During this operation, the weight means 74 and 107 of the governor valve means 26 and 23 act in response to the revolution of the second driving shaft 7 and the driven shaft 18 under the centrifugal effect, and cause each piston 70 and 104 to displace axially outwardly, thereby the oil ports 78 and 111 are respectively connected by means of the annular passages 73 and 110 with the oil ports 77 and 112, and a port of the oil in the conduit 92 is supplied, for the purpose of pressure control governing, through the conduit 98, the oil port 78, the annular passage 73, the oil port 77 and the conduit 79 to the oil port 60 of the main control valve means 27, and thereby urges the plunger piston 52 to shift in the left-hand direction in FIG. 2. At the same time a part of the oil under pressure in the conduit 92 is supplied, for the purpose of speed control governing, through the conduit 113, the oil port 111, the annular passage 110, the oil port 112 and the conduit 125, to the oil port 121 of the shift valve means 24 and thereby urges the piston 116 to move to the right-hand direction as seen in FIG. 2.

Assume now that, during this operation, the revolution speed of the driven shaft 18, namely, the vehicle speed, is increased to a predetermined point, and the pressure for the speed control governing is raised, then the piston 116 of the shift valve means 24 is urged and moves in the right-hand direction as shown in FIG. 2, with compression of the spring means 120, thereby permitting the oil ports 122 and 124 to be connected through the annular passage 119, to further enable the conduits 126 and 127 to be connected. This connection permits the oil under pressure in the conduit 61 to be supplied, through the manual valve means 25, the conduit 126, the shift valve means 24, and the conduit 127, to the oil port 128 of the direct clutch means 16 and thereby causes the direct clutch means 16 to engage in the "ON" position. A part of the oil under pressure in the conduit 127 is supplied, through the one-way check valve 134, and the conduit 132, to the oil port 133 of the low servo valve means 93, and urges, in cooperation with the action of the spring means 97, the piston 96 to move to the left-hand direction in FIG. 2 against the pressure from the oil port 94, thereby permitting the low band 15 to leave the "ON" engagement for the "OFF" arrangement, and accordingly the driving force from the engine 1 is increased by means of the change speed gear means 8 to the higher speed driving.

Line pressure controls for the herein-above described mechanical actions are hereinbelow explained. During the idling operation with the position of each piston of respective valve means being as shown in FIG. 2, oil is moved through a port under pressure and supplied from the tank 20 to the conduit 61 and is supplied to the port 88 of the manual valve means 25; while the port 88 is being closed by the land 83 of the manual piston 82, the oil under pressure and in the conduit 61 will be supplied to the port 55 of the main control valve means 27 and is permitted to flow therefrom through the annular passage 50 of the piston 47 and the conduit 62 to the oil port 37 of the throttle valve means 22. During this piston position, since the oil port 37 of the throttle valve means 22 is being closed by the land 35 of the piston 31, the oil in the conduit 61 is supplied through the conduit 66 having the throat 65 and the port 59 to the right-hand end of the land 49 of the main piston 47 in FIG. 2, and thereby urges the main piston 47 to move to the left as seen in FIG. 2. The line pressure in the conduit 61 thereby gradually increases and the application of this increasing line pressure upon the right-hand end of the land 49 as seen in FIG. 2 causes the main piston 47 to move in the left-hand direction compressing the spring 51 as seen in FIG. 2, thereby permitting the annular passage 50 to be connected to the port 57 through which the excessive oil is exhausted and returned to the tank 20 so that the line pressure is maintained at a predetermined range.

When the manual valve means 25 is operated for the D (drive) range, the piston 82 moves towards the left as seen in FIG. 2, and the conduit 61 and the conduit 92 are connected, thereby the line pressure acts through the port 94 on the piston 96 of the low servo valve means 93 and upon the band 15 for permitting starting of the vehicles. Attendant the running of the vehicle and with the revolution of the second driving shaft 7, the weight means 74 of the piston 70 in the pressure governor valve means 26, receives the centrifugal effect, and the piston 70 is thereby moved according to the said centrifugal effect. The annular passage 73 and the oil port 78 are thus connected and by this connection the oil under pressure and in the conduit 92 is supplied to the conduit 98, the port 78 and the annular passage 73 and acts upon the land 72 of the piston 70 to move the piston 70 in the downward direction as seen in FIG. 2. The passage opening dimension connecting the annular passage 73 and the oil port 78 will depend upon the centrifugal effect which acts upon the weight means 74 and varies in accordance with the degree of the said centrifugal effect, that is the pressure or speed as the governor pressure is supplied, through the oil port 77 and the conduit 79 to the oil port 60 of the main control valve means 27, with the predetermined pressure which is variable responsive to the revolution speed of the second driving shaft 7. The supply of the said governor pressure in the conduit 79 urges the plunger piston 52 in the main control valve means 27 to move the left hand direction as seen in FIG. 2, compressing the spring means 53, and this compression action of the spring means causes the main piston 47 to the right-hand direction equilibrates FIG. 2. With this movement of the main piston 47, the oil port 57 and the annular passage 50 are connected with further large connection dimension and the amount of the oil exhausted from the port 57 and returned to the tank 20 will increase and, thereby the line pressure is reduced so that the resilient force of the spring means 51 to urge the main piston 47 to the right-hand direction equilibrates with the resultant force of the line pressure acting on the right-hand end face of the land 49 of the piston 47 and the governor pressure supplied from the pressure governing valve means 26, through the port 60 to the plunger piston 52 and the spring 53, both urging the main piston 47 towards the left, as seen in FIG. 2. This means that with the increment of the revolution speed of the second driving shaft 7, the line pressure gradually decreases as shown with a graph in FIG. 3, from A to B during running in low-transmission gears, along the decline $a$ to $b$ of the necessary force for actions of the clutch and/or the brake engagements, and during driving in high-transmission gears, the line pressure likewise gradually decreases from A to D along the decline $a$ to $d$ of the necessary force for the clutch and/or brake engagement actions.

When the engine rotation speed is further raised and the revolution speed of the second driving shaft 7 is likewise increased, the governor pressure is raised accordingly and forces the plunger piston 52 further and also further compresses the spring means 53, whereby the oil port 78 will be full open; however, since the governor pressure can not be larger than the line pressure, the line pressure will equilibrate to the governor pressure here and the line pressure will be maintained at a constant level B–C or D–E. It will be noted, therefore, when the throttle valve in the carburetor is set for the low-range opening, the line pressure controlled by the main control valve means 27 will be controlled, according to the increment of the revolution speed of the second driving shaft 7, as shown with dotted lines A–B–C or A–D–E, and thereby the well modulated input for the braking and the clutch-engagement at the substantially irreducible minimum is obtained.

Assume next that the opening range of the throttle valve in the carburetor and the degree of the pedalling for a vehicle acceleration is at ½, the piston 30 of the throttle valve means 22 will compress the spring 32 and displace from the position shown in FIG. 2 to the rightwards direction, thereby the piston 31 is moved by the resilient action of the spring 32 to the right and compresses the spring 33, and the oil port 37 is opened by removing the land 35 therefrom and is connected with the annular passage 36. The oil from the tank, in the operation immediately above described will start to flow with pressure by the action of the pump 19 into the conduit 61, and the oil with pressure supplied therefrom to the conduit 62 will be supplied into the cylinder 29 of the throttle valve means 22 through the port 37. A part of this pressure will also be supplied through the port 38 and the conduit 64 to the oil port 58 of the main control valve means 27, and cause the main piston 47 to move in the right-wards direction as seen in FIG. 2. The pressure from above described throttle valve means 22 is also supplied to the oil port 123, through a conduit connected and another part of this pressure is also supplied to the right-hand end of the land 35 of the valve piston 31 through the port 40 and the conduit 43 and causes the valve piston 31 to move to the left-hand direction. When this throttle pressure increases further, the valve piston 31 will move further towards the left with compressing the spring 32, thereby the oil port 37 is closed with the land 35 and the port 41 will be opened by the land 34 displacing therefrom, and the oil is exhausted therefrom and returned to the tank 20. It is to be noted that when the throttle valve in the carburetor is opened at the constant ½ range, the force urging the valve piston 31 by spring 32 in the right-hand direction, equilibrates with the resultant force urging the valve piston 31 by spring 35 towards the left, and the force urging the valve piston 31 towards the left by the throttle pressure acting upon the right-hand end of the land 35, and whereby the throttle pressure as supplied to the port 58 of the main control valve means 27 and urging the main piston 47 to the right-hand direction will be maintained at a constant degree. Thus the operation in this stage will be carried out similarly to that in which the throttle valve in the carburetor is in the low range open. However, the line pressure in the conduit 61, when the vehicle is in stationary under this operation condition will be maintained at relatively higher range as shown in FIG. 3 at the F point.

When the vehicle starts running when in the immediate above described condition, the governor pressure by the action of the pressure control governing valve means 26 takes place and thereby the main piston 47 will move towards the left compressing the spring 51 and resisting the throttle pressure above described, and permit the annular passage 50 to open to the port 57, and the exhausting of the oil therethrough for returning to the tank 20 decreases the line pressure. With the action as immediately above described, the line pressure is gradually decreased with the increment of the vehicle speed, that is, the revolution speed of the second driving shaft 7, along the decline F to G in the low speed gears, or the decline F to I in the high speed gears, and as described hereinbefore, since the governor pressure cannot be larger than the line pressure, the line pressure here will equilibrate to the governor pressure and is maintained at a constant level G–H or I–J as shown in FIG. 3. Thus, here the input line pressure for the braking and/or the clutch engagement at the D (drive) range is also well modulated so that it is at the irreducible minimum range and decreases along the decline $f$–$g$ or $f$–$i$ which show the necessary force for actions of the clutch and/or the braking at the D (drive) range, and the relationship of the line pressure F–G–H and $f$–$g$–$h$ or F–I–J and $f$–$i$–$j$ are seen as shown in FIG. 3.

When the throttle valve of the carburetor is fully open, the piston 30 of the throttle valve means 22 moves further into the cylinder 29, towards the right-hand direction as seen in FIG. 2, than it does when the throttle valve of the carburetor opens at ½ range as hereinabove described, the line pressure there will be considerably higher than that being under the above described low-open range or ½ open range of the curburetor throttle valve, and decreases with the increment of the vehicle speed. That is, it decreases with the increment of the revolution speed of the second driving shaft 7, from a considerable higher point of K to L with the irreducible minimum higher level than the decline of the necessary force for the clutch and/or brake as shown with $k$–$l$ during the low-speed gear operation. When the operation here is under the high-speed gear, the pressure decline characteristic will be K–N along the decline $k$–$n$ as seen in FIG. 3. The governor pressure here also can not be larger than the line pressure here declined to the points L or N and will equilibrate to the governor pressure and is maintained at levels L–M or N–O. Thus, here the input line pressure for the braking and/or the clutch engagement during operation in the full open condition of the carburetor throttle valve, is well modulated to the characteristic as shown in FIG. 3 with the decline relationship K–L–M to k–l–m during the low-speed gear operation, and K–N–O to k–n–o during the high-speed gear operation.

FIG. 4 shows a modification of the present invention wherein numeral 200 indicates a trochoid-type pump which is operated by the engine 1 and comprises a casing 201, an annular outer rotor 203 rotatably disposed within the said casing 201, and an inner rotor 202 eccentrically rotatably disposed within the said annular outer rotor 203 and engaged with the rotor 203 so that the eccentric rotation of the rotor 202 performs the intake and the exhaust of the oil for the line pressure. The casing 201 has an inlet port 204 and, appropriately and circumferentially spaced from the inlet port 204, also has exhaust ports 205 and 206, said exhaust port 205 having a smaller exhausting capacity so as to be well suited for a sensitive response to the rotation speed of the engine 1. Designated by numeral 207 is a main control valve means which has a cylinder 209 in which a main piston 210 is axially slidably inserted. The main piston 210 has axially spaced larger diameter lands 211 and 212 and an annular passage 213 formed between the said lands 211 and 212. Resiliently disposed in the cylinder 209 is a spring means 214 which urges the main piston 210 towards the right as seen in FIG. 4. Provided and opening to the main control valve means 207 are oil ports 215, 216, 217, 218, 219 and 220; and the oil port 215 is connected through a conduit 221 to the exhaust port 206 of the trochoid pump 200, and the port 216 is connected to the oil port 37 of the throttle valve means 22 through the conduit 62. The oil port 217 is connected to the conduit 221 through a conduit 223 which has a throat 222, and the oil port 218 is connected with a conventional means to the oil tank 20. The oil port 219 is connected through the conduit 64 to the oil port 38 of the throttle valve means 22, and the oil port 220 opening to the right-hand end face of the main piston 210 is connected through a conduit 224 to the exhaust port 205 of the pump 200. The remaining elements shown in FIG. 4 substantially correspond to the embodiment shown in FIG. 2 and the action or function thereof will be understood from the explanation recited with reference to FIG. 2.

Referring to FIG. 4, assume that the engine 1 is started with the manual valve means 25 in the neutral position, and continues the idling drive, the oil pump 200 commences to operate and the oil from the tank 20 is supplied through the exhaust ports 205 and 206 to the conduits 224 and 221. Although the oil in the conduit 221 flows to the port 88, since the port 88 of the manual valve means 25 is being closed by the lands 83 of the piston 82 in the manual valve means 25, the conduit 92 connected for operation of the low servo valve means 93 and the conduits 113 and 125 connected for operation of the speed control governor valve means 23 will have no pressure therein, but the oil in the conduit 221 will flow to the oil port 215 of the main control valve means 207 and is supplied, through the annular passage 213 and the oil port 216, to the conduit 62. Since, however, the oil port 37 of the throttle valve means 22 to which the conduit 62 is connected is being closed by the larger diameter land 35 of the valve piston 31, the line pressure in the conduit 62 and 221 gradually raises, and thereby the line pressure in the conduit 223 connected to the conduit 221 and having the throat 222 accordingly increases and this line pressure is supplied through the port 217 to the right-hand end face of the land 211 and, urges the main piston 210 to move compressing the spring 214 to the left-hand direction as seen in FIG. 4.

The exhausting pressure from the exhaust port 205 will increase with the increment of the engine rotation speed because the force for action closing the exhaust port 205 is small, but when the operation of the engine 1 is in idling condition, the exhaust pressure effective for the pressure, will not take place. When the oil pressure due to the operation of the oil pump 200, as supplied through the exhaust port 206 gradually elevates, and when the pressure transmitted to the right-hand end face of the land 211 of the main piston 210 through the port 217 raises accordingly and exceeds the certain predetermined range, the main piston 210 displaces compressing the spring 214 towards the left as seen in FIG. 4, and permits the annular passage 213 and the port 218 to be connected and the excessive pressure oil is exhausted from the port 218 and returned to the tank 20 by conventional means. This exhausting of the oil causes the reduction of the line pressure acting upon the right-hand end face of the land 211, and permits the main piston 210 to return towards the right with the action of the spring 214 and the oil port 218 is thus closed by the lands 212 so that thereby causes again the raising of the line pressure in the conduit 221.

The variation of the immediate above described line pressure is controlled by the throat 222 so that the line pressure changing is performed with gentle action and, the line pressure in the conduit 221 is substantially maintained at a predetermined point A shown in FIG. 5. During the above described operation, since the engine 1 is in idling condition and at a constant condition and, the exhaust pressure from the exhaust port 205 does not reach to the pressure range effective for the pressure to cause the main piston 210 to move towards the left. Assume now that the manual valve means 25 is shifted to the L (low) range or, to the D (drive) range operation, the conduits 221 and 92 are connected and the line pressure is supplied to operate the low servo valve means 93 and acts to effect the engagement of the low band 15. At the same time, although the line pressure is also supplied to the oil port 111 of the speed governor valve means 23 through the conduit 113, the vehicle is stationary; that is, the revolution speed of the driven shaft 18 is zero and, therefore, the governor pressure in the conduit 125 will not take place. If the vehicle rolls along a declining slope, for instance, since the pump 200 is being driven by the engine 1 and, the oil under pressure is exhausted from the exhaust port 205 to the conduit 224 and therein the effective exhaust pressure relative to the engine rotation speed takes place. This effective exhaust pressure from the exhaust port 205 is supplied to the oil port 220 of the main control valve means 207 and urges the main piston 210 to move left-wards direction in the cylinder 209, compressing the spring 214, as seen in FIG. 4, and connects the annular passage 213 and the oil port 218. This connection of passage and port results in the exhaust of the oil from the port 218 for return to the tank 20. The line pressure is thereby reduced until the resilient force of the spring 214, which normally urges the main piston 210 to move rightwardly, equilibrates with the resultant force of the line pressure from the exhaust port 206, and acts upon the larger diameter land 211 of the main piston 210, and with the effective exhaust pressure from the exhaust port 205 acting upon the righthand end face of the main piston 210, both acting to effect shifting of the main piston 210 to the left-wards direction, as seen in FIG. 4. That is, the line pressure gradually decreases with the engine rotation speed, that is, with the increment of the vehicle speed, along the dotted line A–B, during low-gear operation, and, along the dotted line A–C, during the high-speed gear operation, showing the relationship to the necessary force for the braking and the clutch-engagement which declines along a–b–c during the low-gear operation and, declines along a–d–e during the high-speed gear operation, as shown in FIG. 5.

Next is an explanation of the oil pressure control when the carburetor throttle valve is at the ½ open range, wherein the applying piston 30 compresses the spring 32 and moves to the right within the cylinder 29 from that position shown in FIG. 4, and the valve piston 31 also being forced against the spring 33 is moved towards the right and opens the oil port 37 by removing the larger diameter land 35 therefrom. Under this state, when the vehicle is stationary, the oil is supplied into the conduit 221 by operation of the pump 200, as described in respect of the condition wherein the carburetor throttle valve is set for a low-open range, and the line pressure in the conduit 221 is supplied to the cylinder 29 of the throttle valve means 22, and with a part of the line pressure in the cylinder 29 being supplied, as a throttle pressure, to a port 219 of the main control valve means 207 through the oil port 37, the annular passage 36, the oil port 38 and the conduit 64, and thereby urges the main piston 210 to move towards the right. Another part of the throttle pressure is supplied through the conduit 64 to the shift valve 24. The oil in the conduit 62 is supplied, through the throat 42 and the conduit 43, to the oil port 40 and urges the piston 31 to move towards the left, as seen in FIG. 4. With the increment of the force of this action forcing the valve piston 31 towards the left, the valve piston 31 compresses the spring 32 and moves towards the left, thereby the oil port 37 is closed by the land 35 and the oil port 41 is opened by the land 34 removing therefrom and the oil is exhausted through the port 41 and returned to the tank 20. That is, when the carburetor throttle valve is maintained at the constant ½ open range the resilient force of the spring 32 which urges the piston 31 in the right-hand direction nearly equilibrates the resultant force of the spring 33 which urges the valve piston 31 to the left-hand direction and, the line pressure acting upon the right-hand end face of the land 35 which also acts to urge the valve piston 31 towards the left, so that the throttle pressure applied through the port 219 of the main valve means 207 for urging the main piston 210, is maintained at a constant range. Thus since the main piston 210 is receiving the resulting force of the spring 214 and the said throttle pressure, the line pressure in the conduit 221, in the condition wherein the carburetor throttle valve is in the ½ open range and the vehicle is stationary, will be maintained at the considerable higher point D as shown in FIG. 5.

When the engine 1 starts to increase the operation speed from above described condition and start the vehicle to drive, the exhaust pressure from the exhaust port 205 will be supplied to the port 220 through the conduit 224 as the effective line pressure, and the main piston 210 will move towards the left resisting the resilient force of the spring 214 and the throttle pressure above described and thereby permit the annular passage 213 to connect with the port 218 and thus the amount of the oil exhausting from the port 218 and returning to the oil tank 20 increases and, thus the line pressure is reduced. From the above described action, it will be understood that the line pressure in the conduit 221 decreases with the increment of the effective exhaust pressure from the exhaust port 205 which raises with increment of the engine rotation speed. That is, the decline of the line pressure in the ½ open range of the carburetor valve takes place as shown in FIG. 5 with dotted line D–E in low speed gear operation with the relationship to the decline f–g–h which shows the necessary force for the braking and the clutch-engagement in the low-speed gear operation. And the dotted decline D–F in FIG. 5 shows the line pressure decline in high-speed gear operation relative to the decline f–i–j which shows the necessary force for the braking and the clutch-engagement in high-speed gear operation. When the throttle valve of the carburetor is in full open condition and is operated by the provisions shown in FIG. 4, the line pressure in the conduit 221, when the vehicle is stationary, will be maintained at the further higher point G and declines to H or I as shown in FIG. 5 with dotted line along the line k–l–m or k–n–o according to the high speed or the low-speed change gears operations as described hereinbefore.

Referring now to FIG. 6 wherein numeral 300 with arrow designates a trochoid-type oil pump which being composed of a casing 301, an annular rotor 303 rotatably disposed within the said casing 301, and an inner rotor 302 eccentrically rotatably disposed within the said annular outer rotor 303 so that the eccentric rotation of the rotor 302 performs the intake and the exhaust of the oil for the pressure. Within the casing 301 an inlet port 304 and appropriately circumferentially spaced exhaust ports 305 and 306 are disposed. The exhaust ports 305 and 306 having substantially equivalent exhausting capacities. Numeral 307 with arrow designates a main control valve which has a cylinder 309 in which a main piston 310 is slidably disposed. The main piston 310 has axially spaced larger diameter lands 311, 312 and 313 and form annular passages 314 and 315 therebetween, and is urged to the right-wards direction by means of a spring 316. The control valve means 307 has oil ports 317, 318, 319, 320, 321 and 322, and the port 317 is connected to the exhaust port 306 of the oil pump 300 through a conduit 323, and the port 318 connects with the conduit 62 and the conduit 323 connects with the lubricating circuit (not shown). The port 319 is connected through a conduit 325, which has a throat 324, to the conduit 323, and the port 320 connects with the oil tank 20 and the port 321 is connected to the exhaust port 305 of the oil pump 300 through a conduit 326 and the said conduit 326 connects with the conduit 323 through an one-way check valve 327, and the port 322 connects to the conduit 64. The remaining elements shown in FIG. 6 substantially correspond to the embodiments shown in FIG. 2 and FIG. 4, and the function thereof corresponds with that recited in respect of FIGS. 2 and 4.

Assume now that the engine 1 is started and remains in the idling condition, the oil pump 300 starts to operate and the oil from the tank 20 is supplied to the conduits 326 and 323 through the exhaust ports 305 and 306. A part of the oil under pressure and in the conduit 326 is supplied to the oil port 321 of the main control valve means 307 and acts upon the left-hand end face of the land 311 thereby urges the main piston 310 in the right-hand direction as seen in FIG. 6. Another part of the oil under pressure opens the one-way check valve 327 and is supplied to the conduit 323 and joins with the oil from the exhaust port 306 within the conduit 323 and a part thereof is supplied to the port 88 of the manual valve means 25. Since, however, the oil port 88 is being closed by the land 83 of the manual piston 82, the line pressure will not take place in the conduit 92 and the driving force from the engine is not transmitted to the driven shaft 18. A part of the oil pressure supplied to the conduit 323 is permitted to flow to the port 317 and supplied to the oil port 37 of the throttle valve means 22 through the annular passage 315, the oil port 318 and the conduit 62. Since, however, the said port 37 is being closed by the land 35 of the valve piston 31, the oil pressure within the conduit 323 gradually increases, on the other hand, the oil under pressure and in the conduit 323 is supplied to the port 319 through the conduit 325 having the throat 324 and urges the main piston 310 in the left-hand direction as seen in FIG. 66.

When the line pressure in the conduit 323 gradually increases in the above described manner, with the pressure from the exhaust ports 305 and 306 acting upon the right-hand end face of the land 313, the main piston 310 displaces towards the left as seen in FIG. 6 resisting the action of the spring 316 and the pressure from the exhaust port 305 which is acting upon the left-hand end face of the land 311 tending to urge the main piston 310 towards the right. Such movement of lands 311 to the right permits the oil ports 321 and 320 to be connected, and the excessive oil is thereby exhausted from the port 320 and returned to the tank 20. Therefore, the pressure in the conduit 326 decreases and the one-way check valve 327 closes. As the oil of the conduit 323 is supplied to the lubricating circuit, the pressure in the conduit 323 also decreases. The exhaust of the oil from the port 320 results from the reduction of the oil pressure which acts upon the right-hand end face of the land 313, and thereby the main piston 310 is permitted to move to the right-hand direction by the action of the spring 316 and the pressure acting upon the left-hand end face of the land 311, thereby the connection of the oil ports 320 and 321 is cut off, and the pressure in the conduit 326 again raises and opens the one-way check valve 327 and is again supplied to conduit 323.

The above described variation of the line pressure is performed by the effect of the throat 324 with the stable action, and the line pressure in the conduit 323 will be maintained at A point in FIG. 7. In the hereinabove described disposition, assume now that the manual valve means 25 is moved or operated to the L (low) range or D (drive) range, and the vehicle starts running (rolling along the declining slope, for instance) with the low-open range of the carburetor throttle valve, due to the increment of the engine rotation speed responsive to the vehicle's increased speed, the amount of the exhaust oil from the exhaust ports 305 and 306 increases accordingly and, this increment of the exhausting oil enlarges the connection opening dimension between the ports 320 and 321. However, until the engine rotation speed reaches at a point X and until the vehicle speed reaches to a point B or a point E, the line pressure in the conduit 323 will be maintained at a constant range by the action of the substantial equilibration between the resultant force pressure acting upon the left-hand end face of the land 311 urging the main piston 310 to the right, and the line pressure acting upon the right-hand end face of the land 313 which urges the main piston 310 to the left. In the above described condition, when the engine rotation speed reaches to the point X and the vehicle speed reaches to the point B in the low-speed gear operation and, reaches to the point E in the high-speed gear operation, the connection opening dimension between the ports 320 and 321 increases and the greater amount of the oil in the conduit 326 is exhausted through the port 320 and returned to the tank 20 and, thereby, the pressure of the oil in the conduit 326 is reduced nearly to zero, whereby the force supplied to the left-hand end face of the land 311 to urge the main piston 310 to the right, decreases. Due to this action hereinbefore described equilibration between the forces urging the main piston 310 to the right and urging the main piston 310 to the left, is lost and, the main piston 310 moves towards the left by the action of the line pressure acting upon the right-hand end face of the land 313 and, thereby the dimension opening through and connecting the ports 320 and 321 is further enlarged. By this action the oil in the conduit 326 is all exhausted into the port 320 and the pressure in the conduit 326 will be zero, and due to the pressure difference between the conduits 323 and 326, the one-way check valve 327 is closed. The cutting off by the said check valve 327 causes the sudden lowering of the line pressure to the point C during the low-speed gear operation and, to the point F during the high-speed gear operation.

With further increment of the engine rotation speed, the line pressure in the conduit 323 raises but, the line pressure from the exhaust port 305 is all exhausting through the port 320 to the tank 20 and, therefore, the line pressure in the conduit 323 is maintained at a constant level C–D or F–G as a result of an equilibration between actions of the spring 316 and the line pressure acting upon the right-hand end face of the land 313. When the carburetor throttle valve is at ½ open range, the applying piston 30 of the throttle valve means 22 moves in the cylinder 29 compressing the spring 32 further than that shown in FIG. 6. Responsive thereto, the valve piston 31 is being urged by the spring 32 towards the right direction as seen in FIG. 6 and the oil port 37 will be opened there by displacing the land 35 therefrom, wherein the spring 33 will be further compressed. Under the hereinabove described condition, the oil is supplied by the oil pump 300 while the vehicle is stationary, and the joined exhausting oil pressure from the exhaust ports 305 and 306 as supplied to the conduit 323 is supplied to the oil port 37 of the throttle valve means 22, through the port 317, annular passage 315, the port 318 of the main control valve means 307 and the conduit 62. A part of the above said oil pressure is supplied to the port 322 of the main control valve means 307 as the throttle pressure through the port 38 and the conduit 64 and thereby urges the main piston 310 to the right-hand direction. Another part of the said oil pressure is supplied through the conduit 43 to the port 40 and urges the valve piston 31 to the left-hand direction. With the increment of this urging force the valve piston 31 displaces towards the left end close the port 37 by the land 35 and at the same time the port 41 is opened by displacing the land 34 therefrom and, permits the oil in the cylinder 29 to exhaust therefrom to the oil tank 20. That is, when the carburetor throttle valve is maintained at the ½ open range, the throttle pressure supplied to the oil port 322 and acting upon the left end face of the main piston 310 will be maintained at a constant pressure by way of the equilibration of the force action of the spring 32 forcing the valve piston 31 towards the right, with the resultant force of the action by spring 33 acting at the right-hand end of the valve piston 31 and the throttle pressure acting upon the right-hand end face of the land 35 of the piston 31, both urging the piston in the left-wards direction. It will be noted here that the main piston 310 is maintained further to the right position as compared to that the position in which the carburetor throttle valve is in the low-open range, and at such ½ open range position the piston 310 is maintained at a constant force of the throttle pressure and the action of the spring 316, and therefore, the line pressure in the conduit 323 will be adjusted at a higher point H as seen in FIG. 7. Now permit the engine rotation speed to raise to the point Y during which the line pressure in the conduit 323 will be maintained and at the said constant degree or until the vehicle speed raises to the point I or L the line pressure in the conduit 323 is likewise maintained. When the engine rotation speed raises to the point Y, the line pressure in the conduit 323 will suddenly be reduced to the point J or point M, and within the rotation speed range above the point Y, the line pressure in the conduit 323 will be maintained at a constant level (J–K or M–N in FIG. 7). That is, when the engine rotation speed is within the range below the point Y, the line pressure in the conduit 323 is maintained at a constant degree by way of the equilibration of the force action of the line pressure acting upon the right-hand end face of the land 313 which urges the main piston 310 to move toward the left, with the resultant force of the pressure acting upon the left-hand end face of the land 311 forcing the main piston 310 towards the right, and the action of the throttle pressure and the spring 316, both urging the main piston 310 towards the right.

When the engine rotation speed is within a range above the range of point Y, the line pressure within the conduit 323 will be maintained at a constant range by way of equilibrium of force action of the line pressure acting upon the right-hand end face of the land 313 which urges the piston 310 towards the left, with the resultant force of the action of the throttle pressure together with the action of the spring 316, both urging the piston 310 towards the right.

When the carburetor throttle valve is in full open condition, the throttle pressure will raise further than the above described ½ open range of the carburetor throttle valve, and the line pressure in the conduit 323 will be adjusted at a relatively higher point O as seen in FIG. 7. When the engine rotation speed increases to the point Z and the vehicle speed reaches point P in the low-speed gear operation, or reaches point E in the high-speed gear operation, the line pressure decreases abruptly, and thus the line pressure is adjusted as represented by the dotted lines O–P–Q–R or O–S–T–U.

According to the present invention, as hereinbefore described, the main control valve means is controlled responsive to the rotation speed of the engine and/or responsive to the revolution speed of the driving shaft, so that thereby the line pressure for braking and/or clutch-engagement is correspondingly reduced responsive thereto, thereby achieving a well modulated and substantially irreducible minimum line pressure sufficient for avoiding the slipping and undesirable shock due to excessive line pressure input to the brake and/or clutch. Further, as shown in FIG. 4, changing of the rotation speed of the engine and/or the driving shaft is detected by the trochoid-type oil pump which has a plurality of exhaust port, whereby the specific pressure control governor valve means is not necessary. Further, as shown in FIG. 6, wherein, in addition to eliminating the specific pressure control governor valve means, the capacity of the pump is changeable to the plural ranges of volume, it is well functional when the engine operates with considerable high speed.

What is claimed is:

1. In a transmission mechanism for an automotive vehicle having an engine and fluid torque converter, the combination of a driving shaft operatively connected to the engine, change speed gear means operatively connected to the said driving shaft, a fluid pump, clutch and brake means, fluid conduits having one end connected to the said pump and being operatively connected to the said clutch and brake means, a control means operative responsive to the operation of the said engine and operatively connected to the said fluid conduits for reduction of the line pressure with positive increments of the engine speed.

2. A transmission mechanism as defined in claim 1 wherein the control means is operative responsive to the revolution of said driving shaft, and operatively connected to the said fluid conduits for reduction of the line pressure with position increments of the revolution speed of the said driving shaft.

3. In a transmission mechanism for an automotive vehicle having an engine and a fluid torque converter, the combination of a driving shaft operatively connected to the engine, change speed gear means operatively connected to the said driving shaft, a fluid pump, clutch and brake means, means driven by the said driving shaft and providing a governor pressure that increases with the driving shaft speed, fluid conduits having one end connected to the said pump and the other end operatively connected to the said clutch and brake means, and a control valve under the control of the said governor pressure for controlling the fluid pressure in the said conduits that decreases with the positive increments of engine speed by governor pressure.

4. In a transmission mechanism for an automotive vehicle having an engine, the combination of a driving shaft operatively connected to the engine, a change speed gear means operatively connected to the said driving shaft, clutch and brake means, a trochoid-type pump adapted to be driven by the said engine, the said pump having a first exhaust port and a second exhaust port each providing output fluid pressure that varies with the engine speed, a control valve means having a fluid pressure area and controlling the fluid pressure introduced to the said second exhaust port, the said control valve that causes the first output pressure from the first one of the said exhaust ports to work on the said fluid pressure area for controlling the second output pressure from the second one of the said exhaust ports whereby the said second output pressure decreases with increase of the engine speed, and means for applying the said second output pressure to the said clutch and brake means.

5. In a transmission mechanism for an automotive vehicle having an engine, the combination of a driving shaft operatively connected to the engine, a change speed gear means operatively connected to the said driving shaft, clutch and brake means, a trochoid-type pump adapted to be driven by the said engine, and a pump having a first fluid outlet and a second fluid outlet, each providing output fluid pressure that varies with engine speed, a control valve having a first fluid pressure area and a second fluid pressure area and controlling the said fluid pressure, a first conduit connected to the said first fluid outlet, the said first conduit connected for applying the first fluid pressure tending to move the said control valve in one direction on the first pressure area, a second conduit connected to the said second fluid outlet and the third conduit which has a one-way check valve and is connected to the said first conduit, the said second conduit connected for applying the second fluid pressure tending to move the said control valve in another direction on the second fluid pressure area when the said first fluid pressure in the first conduit is within a predetermined valve, the said second pressure applied to the second fluid pressure area being exhausted to the pump through an exhaust port of said control valve when the said first fluid pressure in the first conduit is above a predetermined valve whereby the said first fluid pressure in the first conduit decreases when the engine speed is above a predetermined one, and means for applying the said first fluid pressure to the said clutch and brake means.

References Cited

UNITED STATES PATENTS

| | | | |
|---|---|---|---|
| 2,547,392 | 4/1951 | Hill et al. | 103—126 |
| 3,004,447 | 10/1961 | Sand | 74—868 |
| 3,137,234 | 6/1964 | Mosbacher | 103—2 |
| 3,313,183 | 4/1967 | Bailey et al. | 74—752 |

ARTHUR T. McKEON, Primary Examiner